(12) United States Patent
Tempel et al.

(10) Patent No.: US 10,085,004 B2
(45) Date of Patent: Sep. 25, 2018

(54) DUAL-SCREEN HEAD-MOUNTED DISPLAYS

(71) Applicant: Oculus VR, LLC, Menlo Park, CA (US)

(72) Inventors: Mark Alan Tempel, Sammamish, WA (US); Jared I. Drinkwater, Auburn, WA (US); Robin Michael Miller, Redmond, WA (US); Joseph Patrick Sullivan, Issaquah, WA (US)

(73) Assignee: OCULUS VR, LLC, Menlo Park, CA (US)

( * ) Notice: Subject to any disclaimer, the term of this patent is extended or adjusted under 35 U.S.C. 154(b) by 217 days.

(21) Appl. No.: 14/861,910

(22) Filed: Sep. 22, 2015

(65) Prior Publication Data

US 2016/0366399 A1    Dec. 15, 2016

Related U.S. Application Data

(60) Provisional application No. 62/175,877, filed on Jun. 15, 2015.

(51) Int. Cl.
*H04N 13/04*    (2006.01)
*G06T 19/00*    (2011.01)
*G02B 27/01*    (2006.01)

(52) U.S. Cl.
CPC ....... *H04N 13/044* (2013.01); *G02B 27/0176* (2013.01); *G06T 19/006* (2013.01); *G02B 2027/0181* (2013.01); *H04N 2213/001* (2013.01)

(58) Field of Classification Search
None
See application file for complete search history.

(56) References Cited

U.S. PATENT DOCUMENTS

| | | | | |
|---|---|---|---|---|
| 1,636,443 | A | * | 7/1927 | Schumacher ........... A61F 9/025 109/58.5 |
| 5,347,400 | A | | 9/1994 | Hunter |
| 6,072,626 | A | | 6/2000 | Ichikawa |
| 6,597,346 | B1 | * | 7/2003 | Havey .................... G06F 3/002 345/169 |
| 2002/0020005 | A1 | * | 2/2002 | Tsubooka ............... A61F 9/025 2/452 |
| 2004/0008157 | A1 | * | 1/2004 | Brubaker ............. G02B 27/017 345/8 |
| 2006/0072206 | A1 | | 4/2006 | Tsuyuki et al. |
| 2009/0147358 | A1 | | 6/2009 | Charlesworth |
| 2012/0218301 | A1 | | 8/2012 | Miller |

(Continued)

OTHER PUBLICATIONS

Tempel, Office Action, U.S. Appl. No. 14/861,917, dated May 3, 2017, 16 pgs.

(Continued)

*Primary Examiner* — Janese Duley
(74) *Attorney, Agent, or Firm* — Morgan, Lewis & Bockius LLP

(57) ABSTRACT

A head-mounted display system includes a left lens for a user's left eye and a right lens for the user's right eye. The head-mounted display system also includes left and right display screens. The left display screen is coupled to the left lens to provide images to the user's left eye through the left lens. The right display screen is coupled to the right lens to provide images to the user's right eye through the right lens.

14 Claims, 14 Drawing Sheets

(56) References Cited

U.S. PATENT DOCUMENTS

| | | |
|---|---|---|
| 2014/0266986 A1 | 9/2014 | Magyari |
| 2015/0077416 A1* | 3/2015 | Villmer ................ G02B 27/017 |
| | | 345/419 |
| 2015/0234189 A1 | 8/2015 | Lyons |
| 2015/0253574 A1* | 9/2015 | Thurber ............. G02B 27/0172 |
| | | 359/630 |
| 2016/0320612 A1 | 11/2016 | Zhang |

OTHER PUBLICATIONS

Tempel, Notice of Allowance, U.S. Appl. No. 14/861,917, dated Oct. 20, 2017, 8 pgs.

* cited by examiner

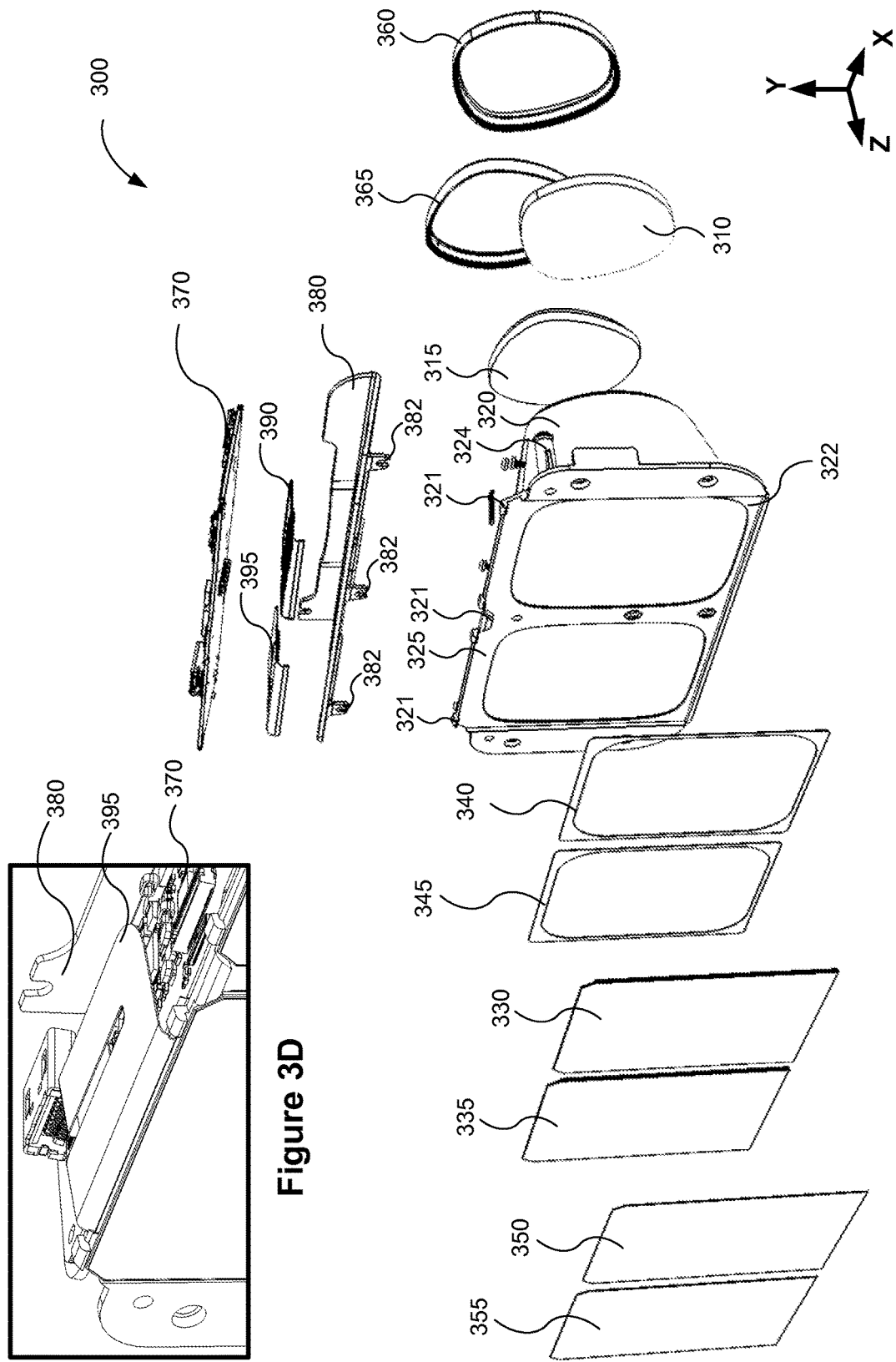

DUAL-SCREEN HEAD-MOUNTED DISPLAYS

RELATED APPLICATIONS

This application claims priority to U.S. Provisional Patent Application Ser. No. 62/175,877, filed Jun. 15, 2015, entitled "Dual-Screen Head-Mounted Displays," which application is incorporated by reference in its entirety.

TECHNICAL FIELD

This application relates generally to wearable technology and virtual-reality technology, including but not limited to a head-mounted display.

BACKGROUND

Virtual-reality head-mounted displays have wide applications in various fields, including engineering design, medical surgery practice, military simulated practice, and video gaming. For example, a user wears a virtual-reality head-mounted display integrated with audio headphones while playing video games so that the user can have an interactive experience in an immersive virtual environment.

However, it may be difficult for a user to properly adjust and comfortably wear the head-mounted displays and the integrated audio systems using the existing technology, which may negatively affect the user's experience. Also, use of a single screen to provide images to both eyes may negatively affect the image quality.

SUMMARY

In accordance with some embodiments, a head-mounted display system includes a left lens for a user's left eye and a right lens for the user's right eye. The head-mounted display system also includes left and right display screens. The left display screen is coupled to the left lens to provide images to the user's left eye through the left lens. The right display screen is coupled to the right lens to provide images to the user's right eye through the right lens.

In accordance with some embodiments, a head-mounted display system includes an opaque housing; a left display screen, mounted within the opaque housing, for a user's left eye; and a right display screen, mounted within the opaque housing, for the user's right eye.

Various advantages of the present application are apparent in light of the descriptions below.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

FIGS. 3A, 3B, and 3D are perspective views of components of a head-mounted display in accordance with some embodiments.

FIGS. 3C and 3E are exploded views showing components of a head-mounted display in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first segment could be termed a second segment, and, similarly, a second segment could be termed a first segment, without departing from the scope of the various described embodiments. The first segment and the second segment are both segments, but they are not the same segment.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
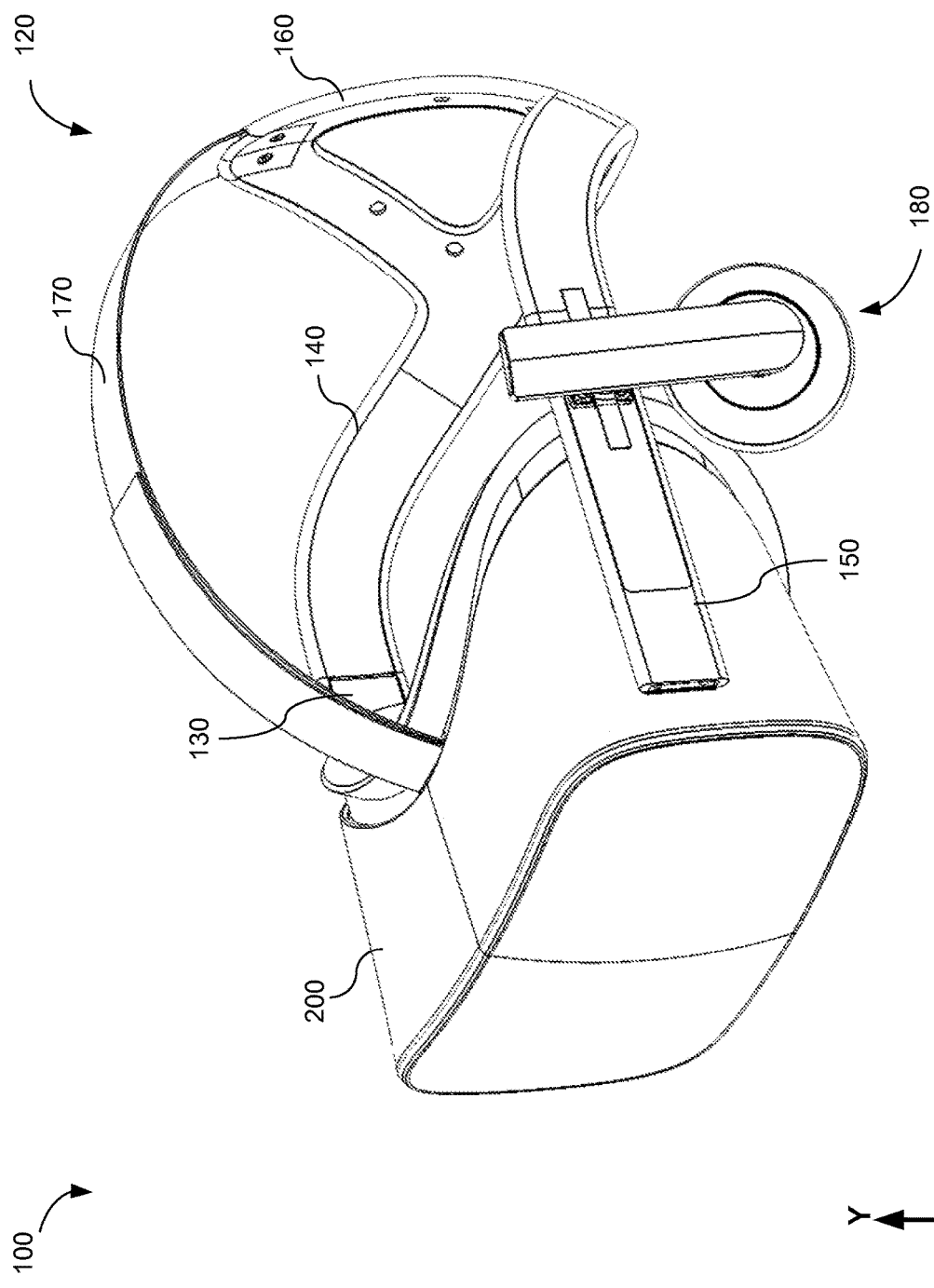
FIG. 1 is a perspective view of a head-mounted display system in accordance with some embodiments.

FIG. 1 is a perspective view of a head-mounted display system 100 in accordance with some embodiments. In some embodiments, the head-mounted display system 100 comprises a head-mounted display 200, a strap system 120, and a detachable audio subsystem 180. Although not shown due to the perspective, the head-mounted system 100 may have two audio subsystems located on left and right sides to provide audio signals to the user's left and right ears. Each of the left and right audio subsystems may use substantially symmetric structures for coupling the speaker to a corresponding rigid segment of the strap system 120.

The strap system 120 is used for mounting the head-mounted display 200 on a user's head. In the example of FIG. 1, the strap 120 comprises a rigid segment 130, a semi-rigid segment 140, and a rigid segment 150 that are coupled to each other to adjustably wrap around side and back portions of the user's head.

In some embodiments, the strap 120 comprises a single and continuous semi-rigid segment 140 including two arc portions, and each arc portion is to extend from above a user's ears to below the user's occipital lobe to conform to a portion of the user's head. Alternatively, the strap 120 may comprise two separate and symmetric semi-rigid segments each including an arc portion.

In some embodiments, the rigid segments 130 and 150 are respectively connected to the semi-rigid segment 140. The rigid segments 130 and 150 are also respectively coupled to the head-mounted display 200 and positioned on respective sides of the user's head to extend along the lateral dimension (e.g., the Z dimension in FIG. 1). The strap 120 may further include flexible segments (not shown) that are stretchable within the rigid segments 130 and 150 respectively to adjust the strap 120 in accordance with the user's head.

In some embodiments, the strap 120 comprises a back piece 160 coupled with the semi-rigid segment 140 to rest against the back of the user's head (e.g., around the user's occipital lobe). For example as shown in FIG. 1, the back piece 160 is in triangular shape with a hollow and triangular center. The semi-rigid piece 140 extends to wrap around a portion at the back of the user' head (e.g., around the user's occipital lobe). The semi-rigid piece 140 includes a portion that conforms to the shape of the back piece 160 and the back piece 160 is coupled to the portion of the semi-rigid piece 140 at the back of the user's head.

In some embodiments, the strap 120 comprises a top strap 170 coupled to the back piece 160 (or the semi-rigid segment 140) and the head-mounted display 200 to adjustably conform to the top of the user's head when the user is wearing the head-mounted display.

In some embodiments, various electrical connection mechanisms (e.g., flat flexible circuits and/or electric cables) are used in the head-mounted display system 100 to provide power management, signal transmission, and/or other functionalities to the head-mounted display 200 and the detachable audio subsystem 180. For example, the head-mounted display 200 is integrated with the detachable audio subsystem 180 using suitable electrical connection mechanisms to provide both visual and audio virtual-reality experiences to the user.

Various embodiments of the strap system 120 and the head-mounted display system 100 are described in U.S. patent application Ser. No. 14/603,335, filed on Jan. 22, 2015, and U.S. patent application Ser. No. 14/681,001, filed on Apr. 7, 2015, the disclosures of which are incorporated herein by reference in their entireties.

Various embodiments of the detachable audio subsystem 180 and coupling mechanisms between the detachable audio subsystem 180 and the head-mounted display system 100 are described in U.S. patent application Ser. No. 14/627,639, filed on Feb. 20, 2015, U.S. Provisional Patent Application No. 62/174,298, filed on Jun. 11, 2015, and U.S. Provisional Patent Application No. 62/174,359, filed on Jun. 11, 2015, the disclosures of which are incorporated herein by reference in their entireties.

Figure 2A:
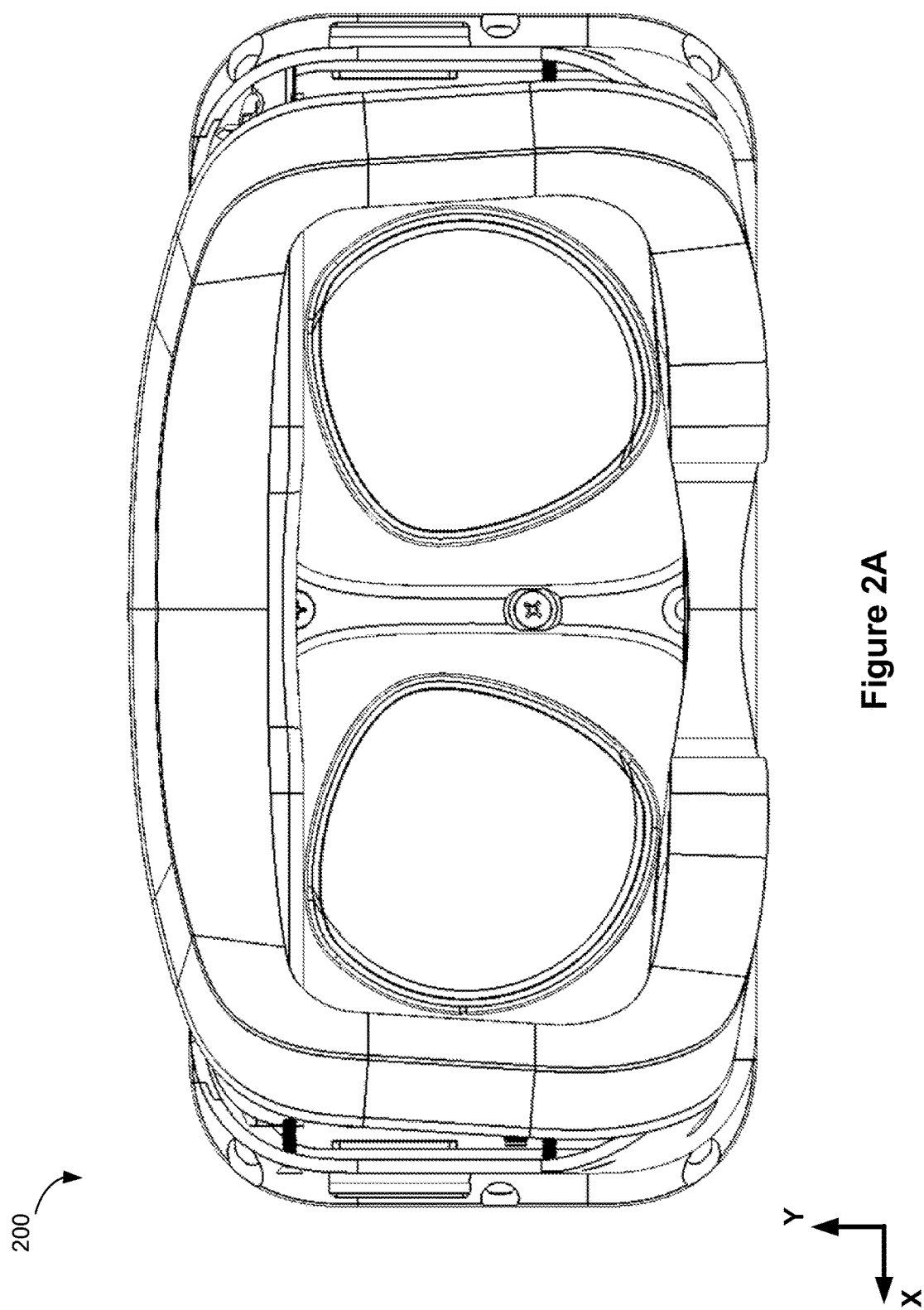
FIG. 2A is a back view of a head-mounted display in accordance with some embodiments.
Figure 2B:
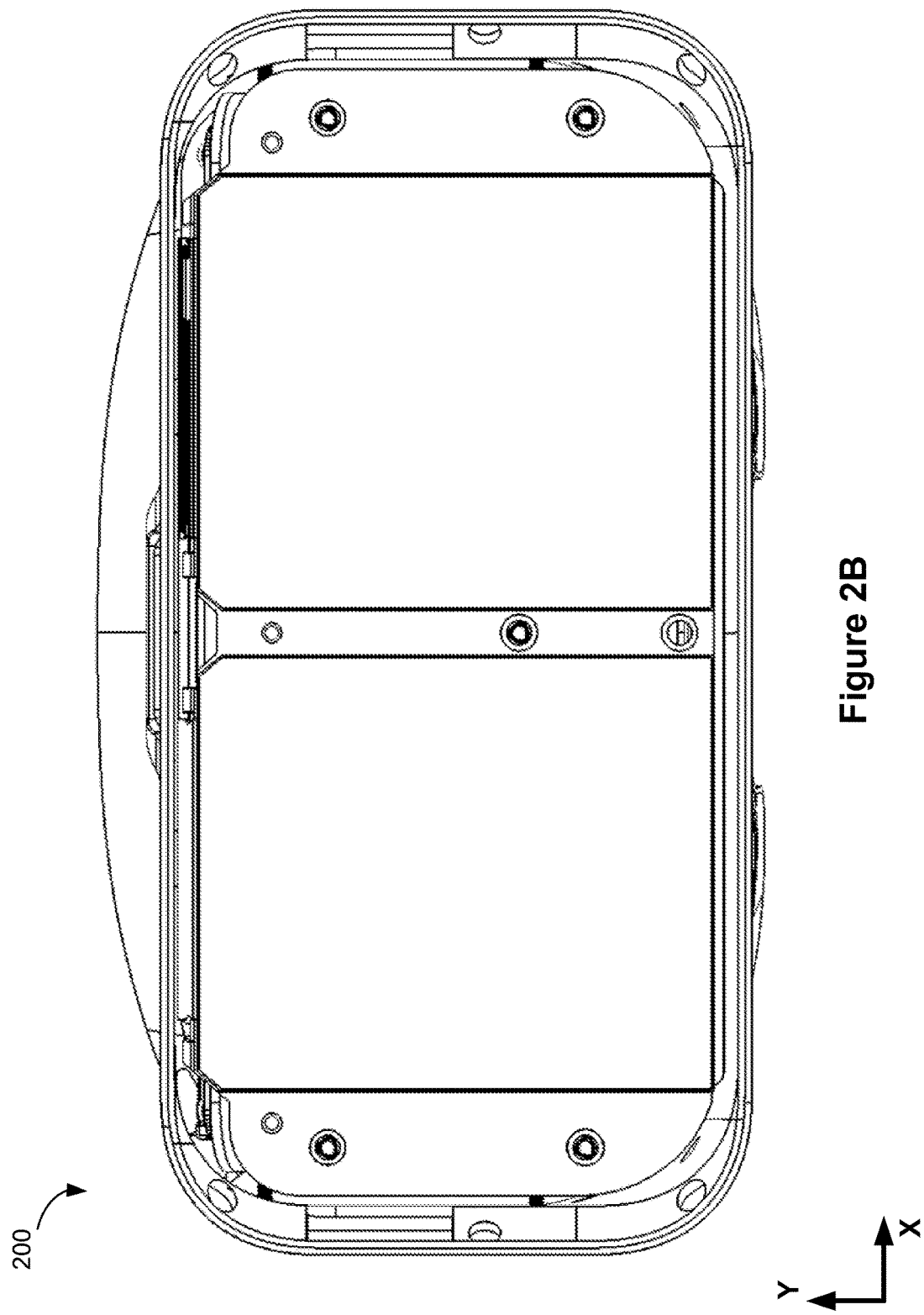
FIG. 2B is a front view of a head-mounted display in accordance with some embodiments.
Figure 2C:
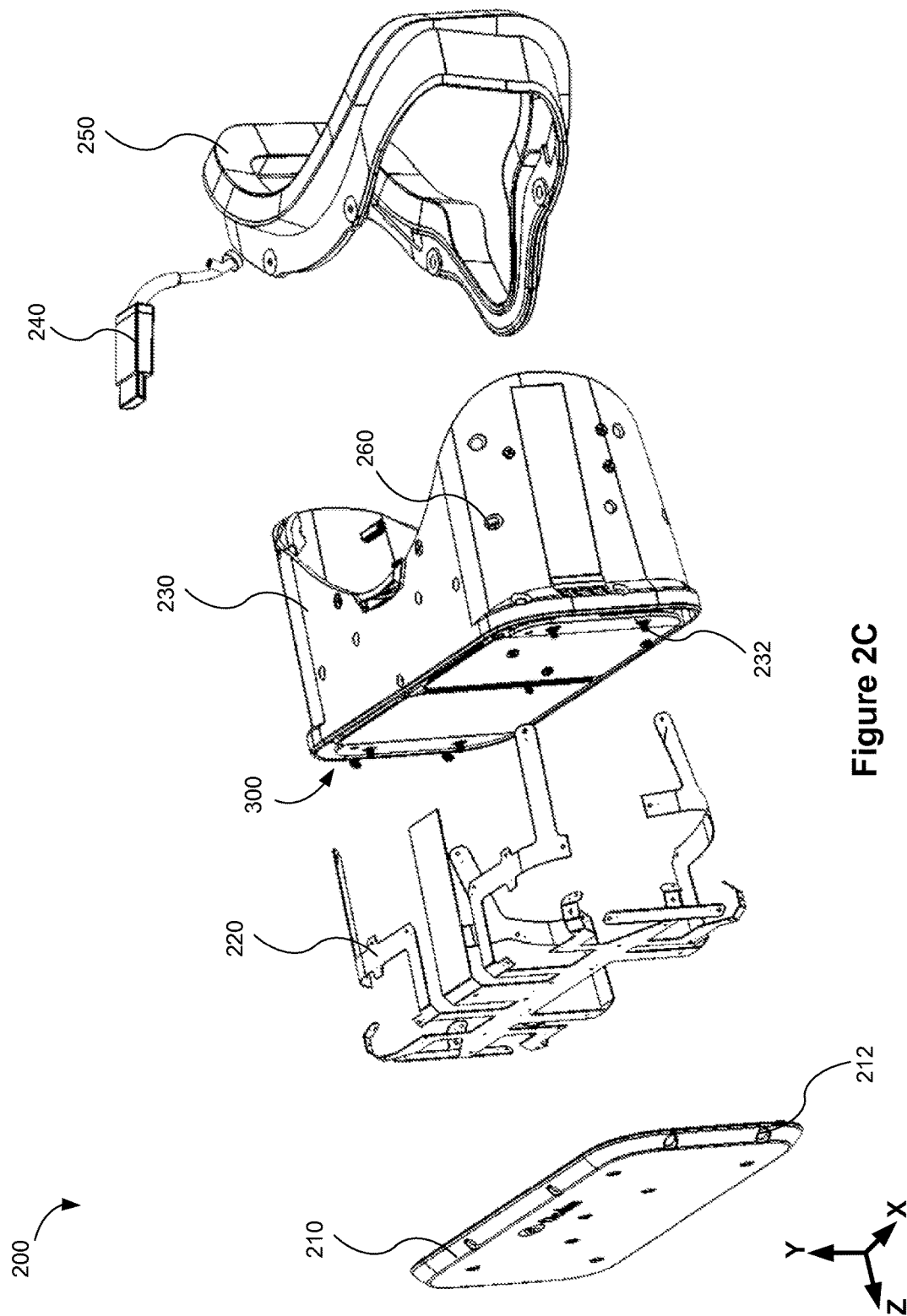
FIG. 2C is an exploded perspective view illustrating components of a head-mounted display in accordance with some embodiments.

FIGS. 2A-2C are front, back, and perspective views respectively of the head-mounted display 200 in accordance with some embodiments. FIG. 2C is an exploded view of the head-mounted display 200, while FIGS. 2A and 2B show the head-mounted display 200 as assembled. As shown in FIG. 2C, the head-mounted display 200 includes a opaque front cover 210 to cover the front of the head-mounted display 200, flexible circuits 220 distributed inside the head-mounted display 200, an opaque housing 230 to house an assembly 300, a foam 250 coupled to the opaque housing 230 to rest against a user's face when the user wears the head-mounted display 200, and electrical connectors 240 (e.g., cables, circuits, wires). The front cover 210 can be coupled to the assembly 300 using one or more connectors 232, such as screws, by inserting the connectors 232 through the screw holes 212 on the front cover 210. The front cover 210 and the opaque housing 230, when connected, may be considered a single opaque housing of the head-mounted display 200. In some embodiments, the housing is opaque at visible wavelengths but not at infrared wavelengths.

A plurality of infrared (IR) LED lights 260 are distributed on the surfaces of the housing 230 and the front cover 210. In conjunction with an external camera, the IR LED lights 260 are used for sensing motions of the user's head. The flexible circuits 220 provide power management and transmit electrical signals among different components (e.g., display screens, IR LED lights 260, and detachable audio system 180) of the head-mounted display system 100.

Figure 3A:
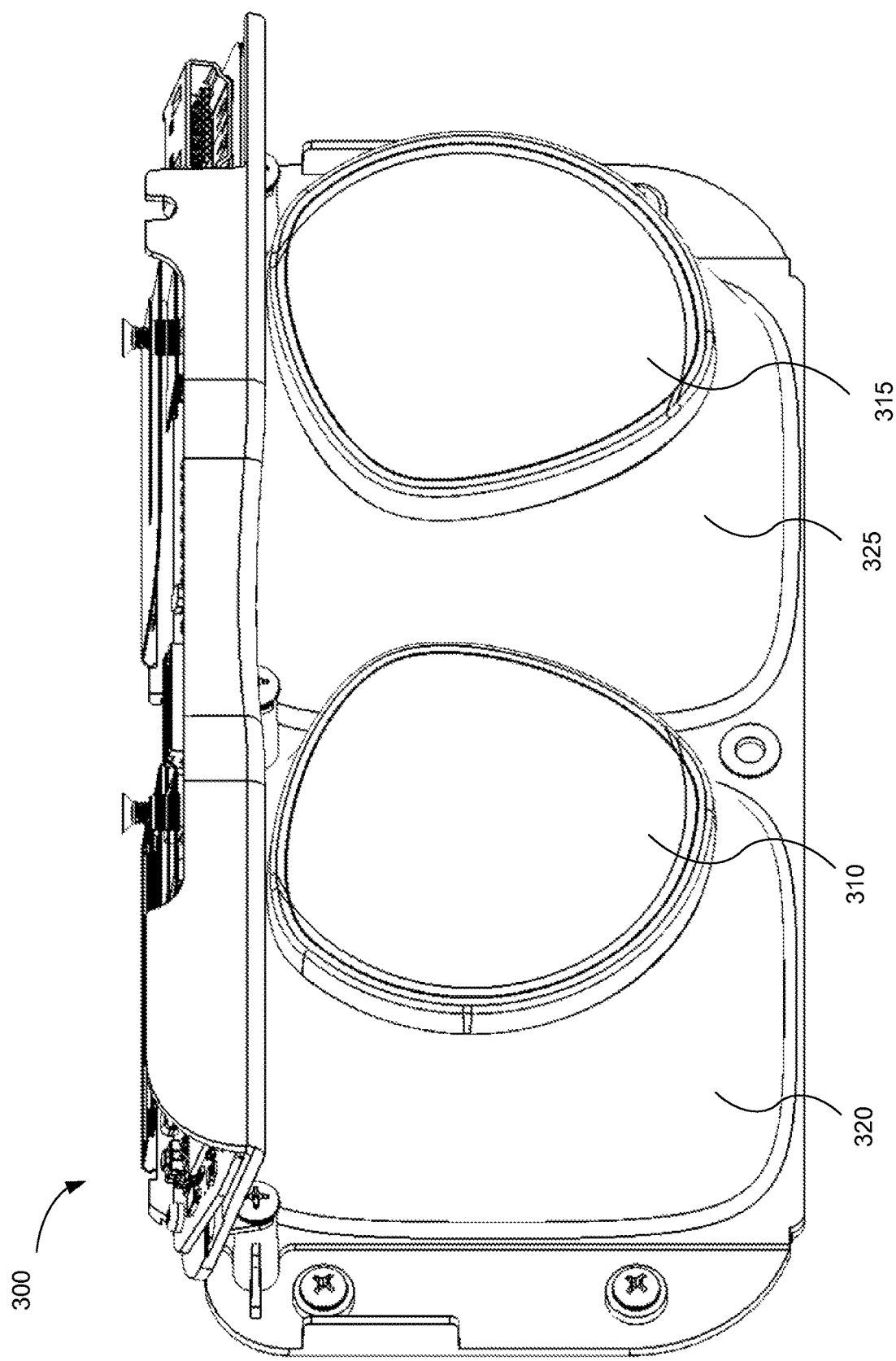
Figure 3B:
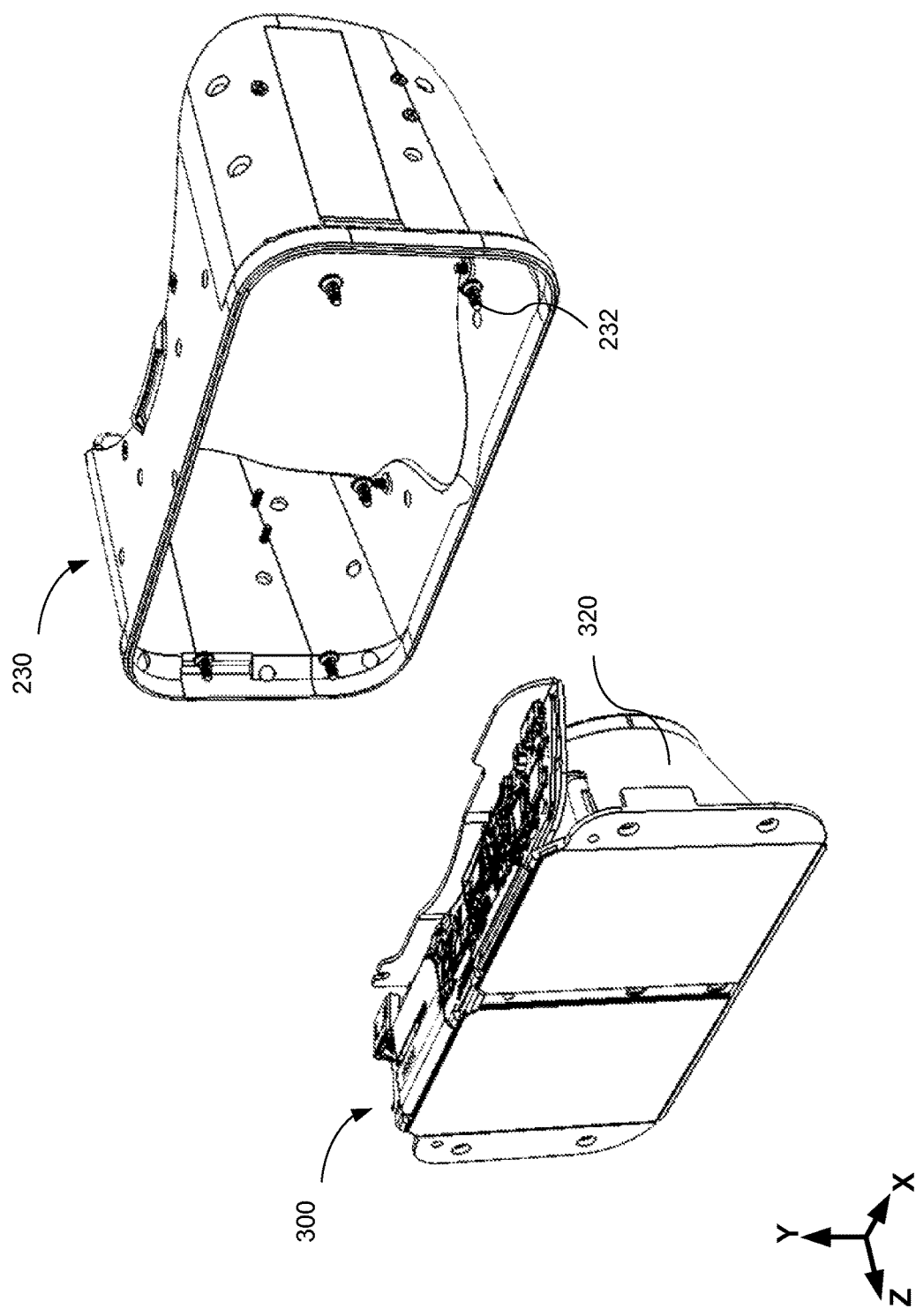

FIGS. 3A-3C are perspective views of the assembly 300 in accordance with some embodiments. As shown in FIG. 3B, the opaque housing 230 can be coupled to the assembly 300 using one or more connectors, such as screws.

As shown in FIG. 3C, which is an exploded perspective view, the assembly 300 includes a left lens 310 for a user's left eye and a right lens 315 for a user's right eye. The assembly 300 also includes a left display screen 330 disposed in front of the left lens 310 to provide images to the user's left eye through the left lens 310. Similarly, the assembly 300 includes a right display screen 335 disposed in front of the right lens 315 to provide images to the user's right eye through the right lens 315. In some embodiments, a lateral distance between the left display screen 330 and the right display screen 335 is adjustable. This lateral distance corresponds to an interpupillary distance, which is thus adjustable. The left display screen 330 and the right display screen 335 can be light-emitting diode displays (LEDs), e-ink displays, plasma display panels (PDPs), liquid crystal displays (LCDs), organic light-emitting diode displays (OLED), or using any other suitable display technologies.

As shown in FIGS. 3A-3C, a left eye cup 320 includes one end coupled to the left lens 310 and an opposite end coupled to the left display screen 330. Similarly a right eye cup 325 includes one end coupled to the right lens 315 and an opposite end coupled to the right display screen 335. In some embodiments, stretchable fabrics (not shown) are connected to (e.g., stitched around) the left eye cup 320 and the right eye cup 325 such that when the user is using the head-mounted display system 100, components inside the head-mounted display 200 are covered to avoid any visual interference or confusion to the user.

As shown in FIG. 3C, the assembly 300 further includes a left frame 340 situated between the left eye cup 320 and the left display screen 330, and a right frame 345 situated between the right eye cup 325 and the right display screen 335.

In some embodiments, the assembly 300 also includes a left panel 350 situated in front of the left display screen 330, and a right panel 355 situated in front of the right display screen 335. The left panel 350 and right panel 355 provide backing for the left and right display screens and protect the left and right display screens.

In some embodiments, the assembly 300 includes a left mounting ring 360 to mount the left lens 310 on the left eye cup 320. Similarly, a right mounting ring 365 is used to mount the right lens 315 on the right eye cup 325.

In some embodiments as shown in FIG. 3C, the left eye cup 320 and the right eye cup 325 are formed in one continuous piece and further integrated with a front bracket 322. The front bracket 322 includes grooves to fit the left frame 340 and the right frame 345, the left display screen 330 and the right display screen 335, and the left panel 350 and the right panel 355. One or more clips 321 are further used to hold the left frame 340 and the right frame 345, the left display screen 330 and the right display screen 335, and the left panel 350 and the right panel 355 within the grooves of the front bracket 322.

Figure 3E:
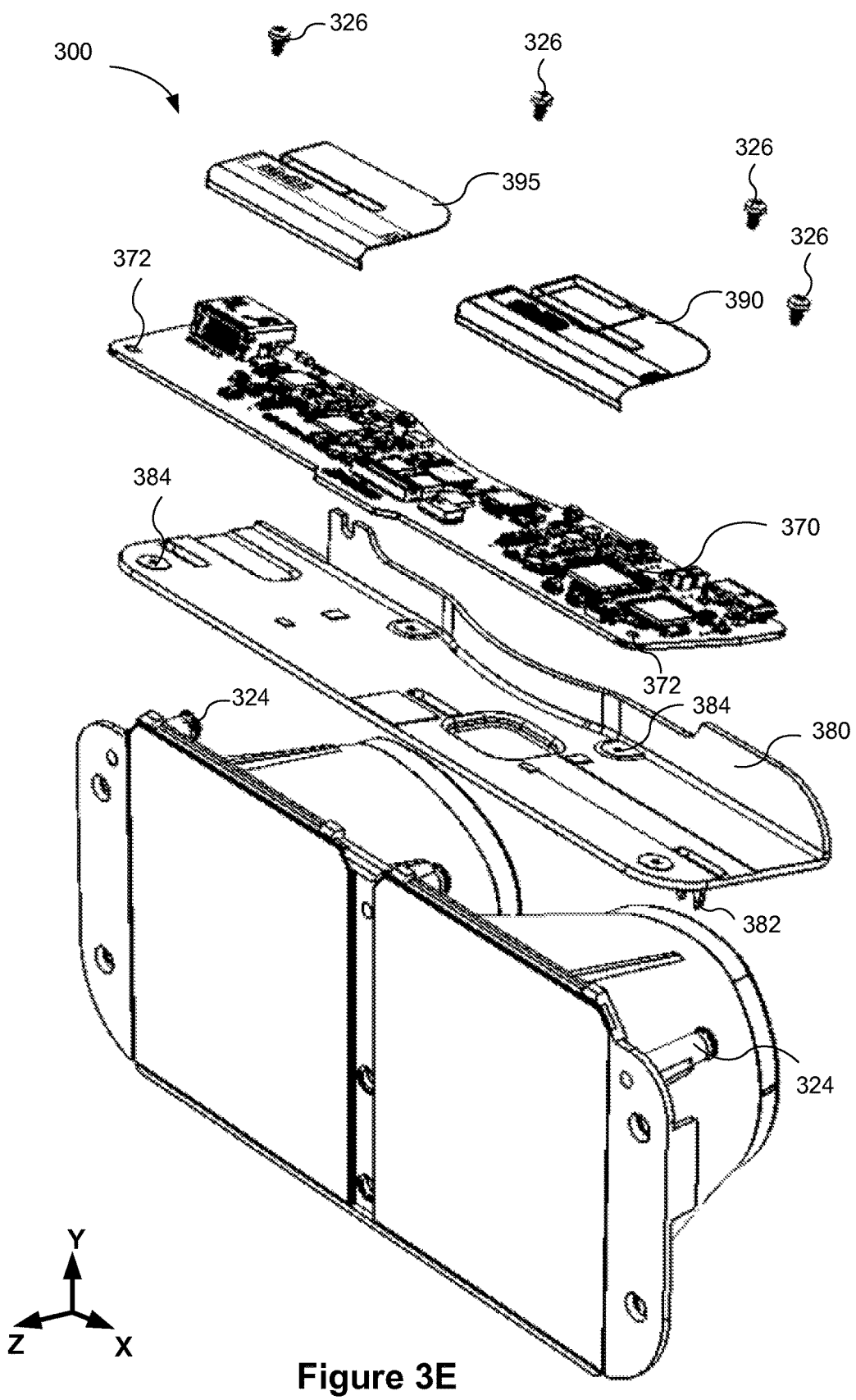

As shown in FIGS. 3C and 3E, the assembly 300 includes a top bracket 380 with one or more clips 382 to couple to one or more protrusions 324 on the left eye cup 320 and the right eye cup 325. In some embodiments, the bracket 380 is further coupled to the housing 230 to fix the assembly 300 inside the housing 230.

The assembly 300 also includes a circuit board 370 to provide various functionalities, such as power management, electrical connection, and signal transmission. For example, the circuit board 370 includes driver circuitry for the left display screen 330 and the right display screen 335. The circuit board 370 is connected with the flexible circuit 220 and the cable 240. A left flexible circuit 390 and a right flexible circuit 395 are situated on top of the circuit board 370 to electrically connect the circuit board 370 to the left display screen 330 and the right display screen 335.

One or more connectors 326 (e.g., screws) are used to couple the circuit board 370 and the top bracket 380 together. For example, the one or more connectors 326 insert through one or more screw holes 372 on the circuit board 370 and one or more screw holes 384 on the top bracket 380 to couple the circuit board 370 with the top bracket 380.

Figure 4A:
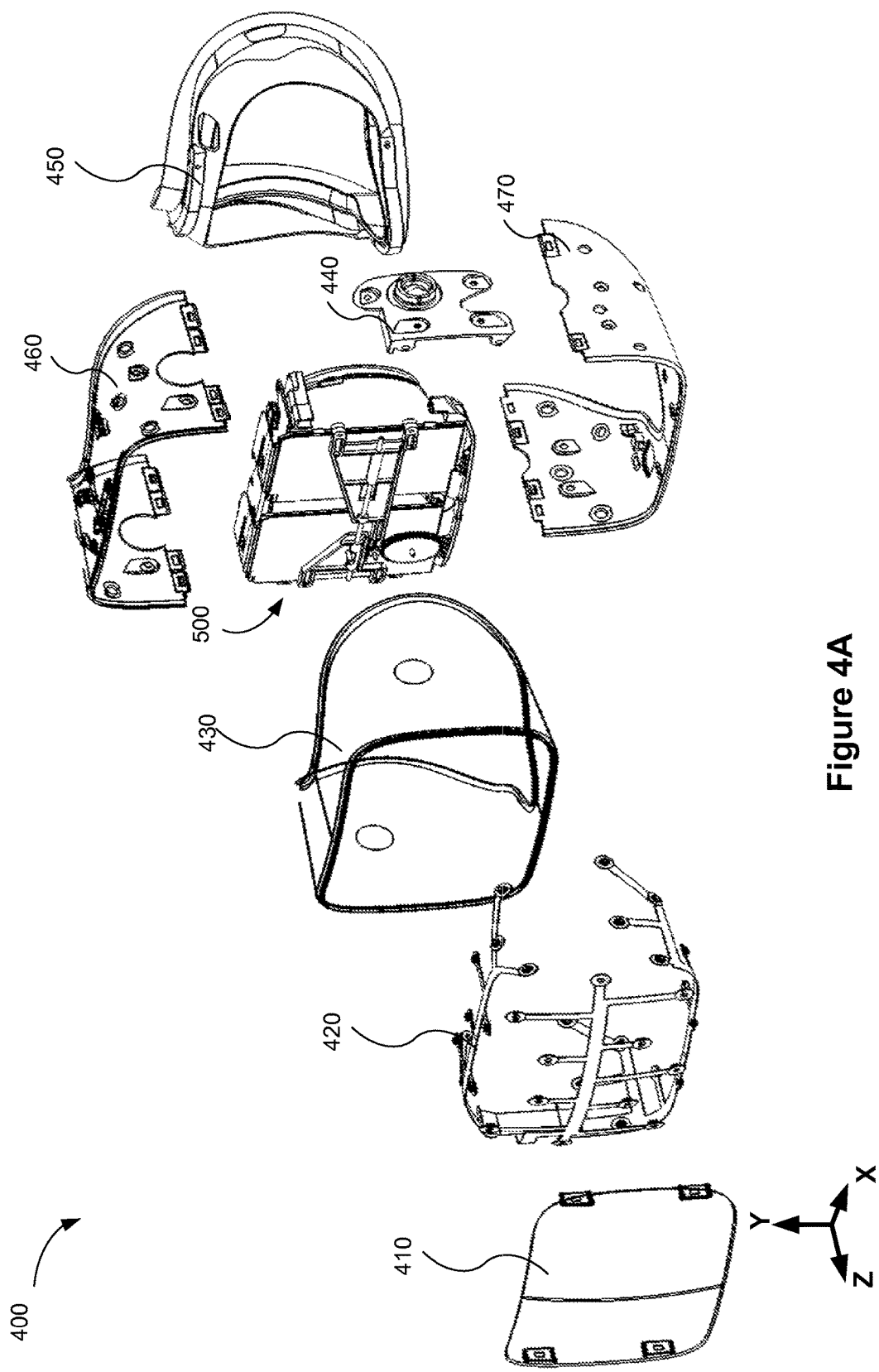
FIG. 4A is an exploded perspective view of a head-mounted display in accordance with some embodiments.
Figure 4B:
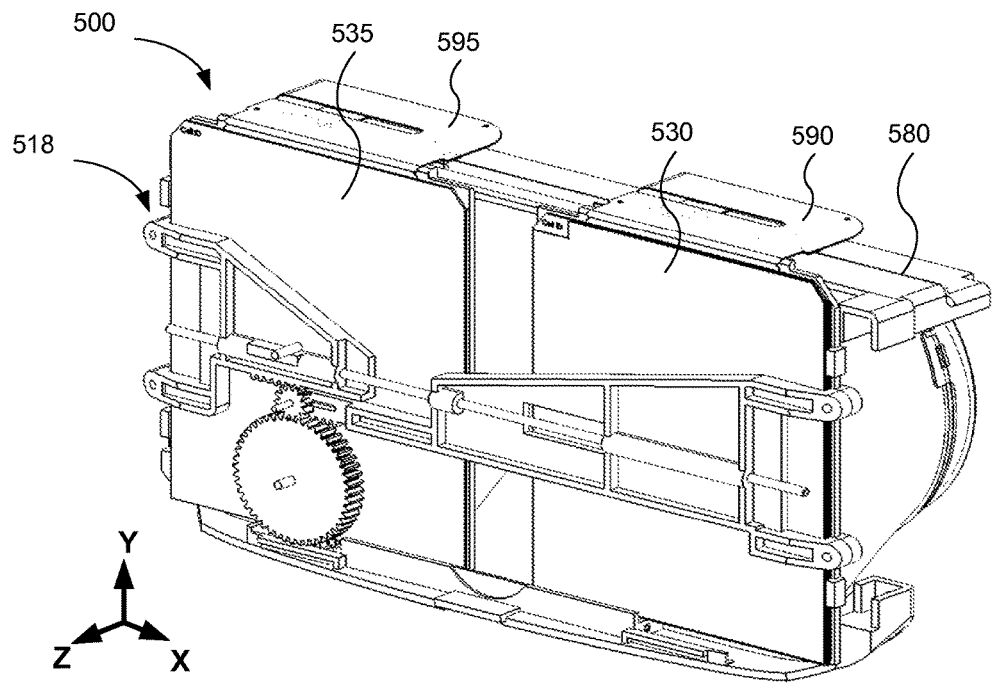
FIGS. 4B-4F are perspective views of components of a head-mounted display in accordance with some embodiments.
Figure 4C:
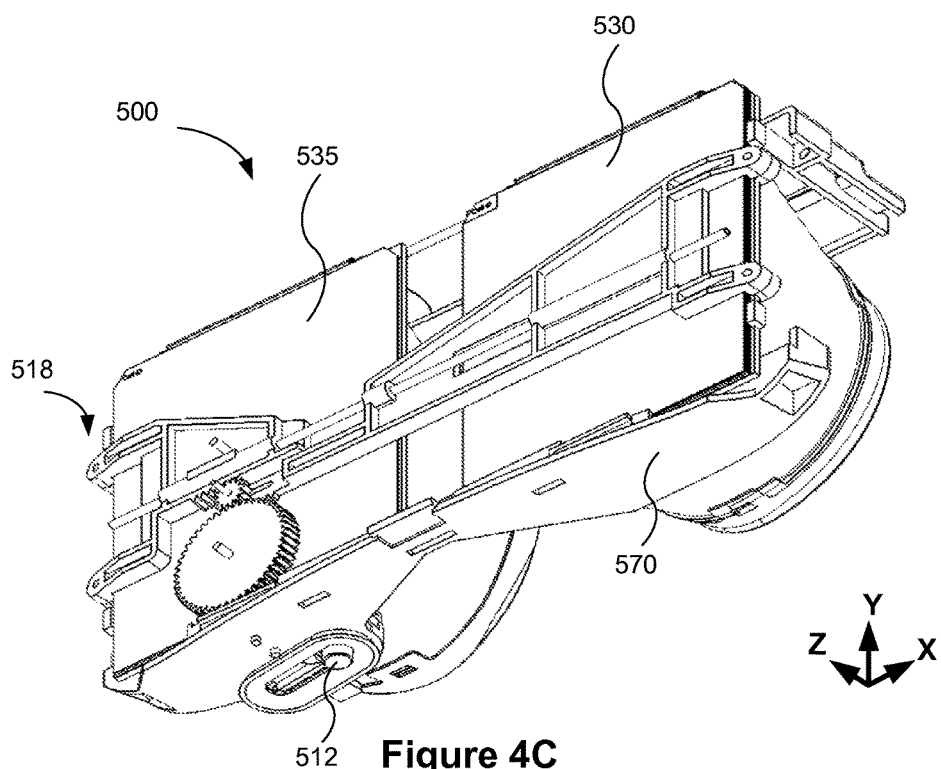
Figure 4D:
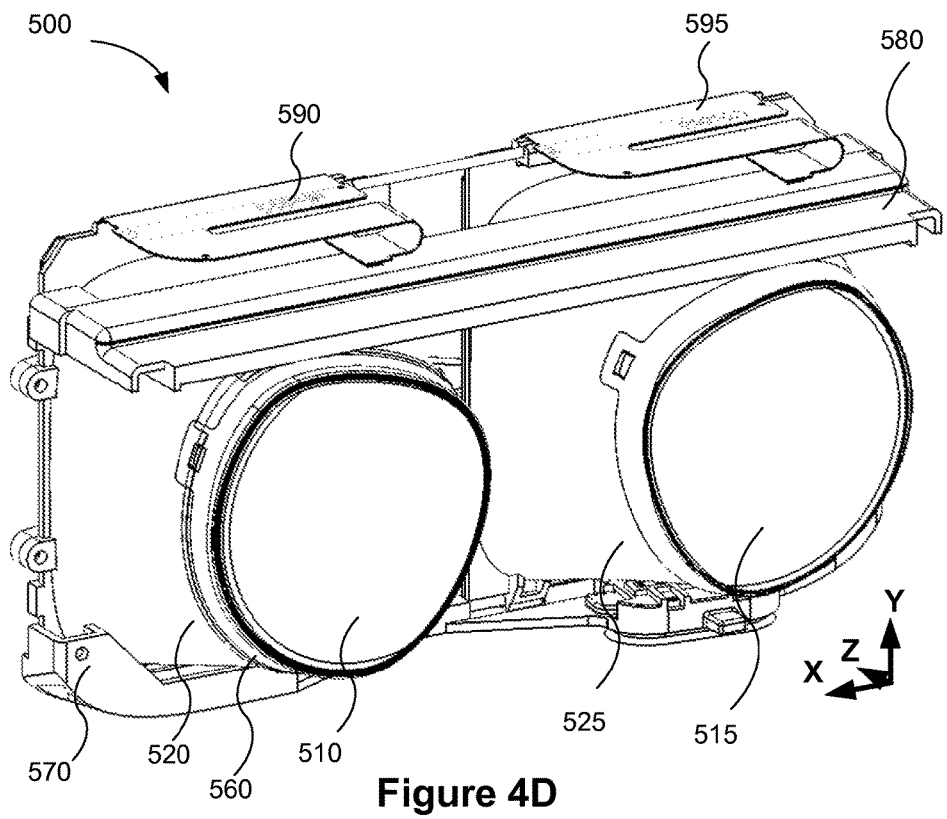
Figure 4E:
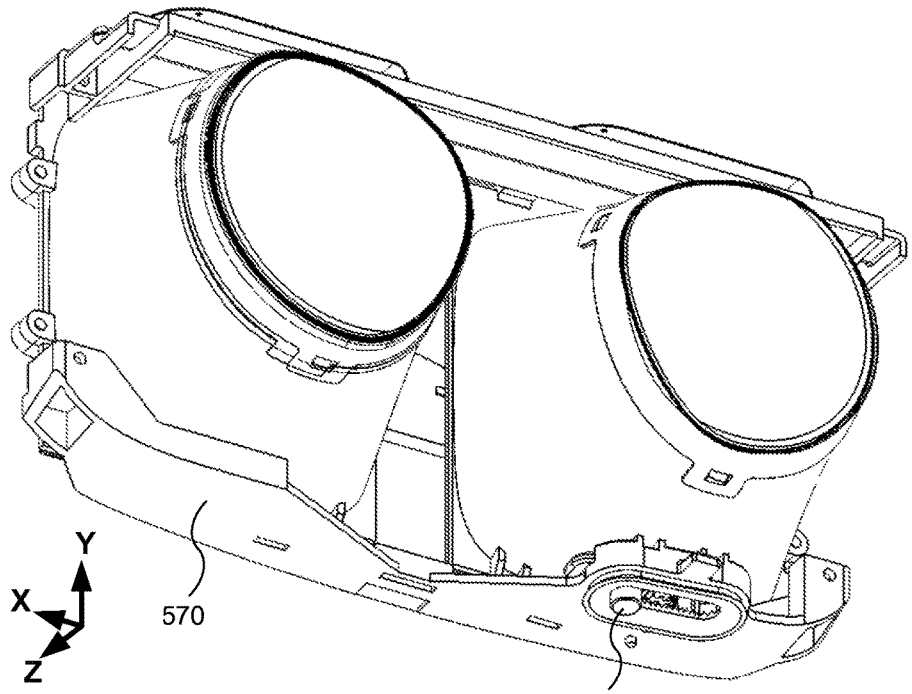

FIG. 4A is an exploded perspective view of a head-mounted display 400 in accordance with some embodiments. The head-mounted display 400 can be integrated in the head-mounted display system 100, in place of the head-mounted display 200. Similar to the head-mounted display 200, the head-mounted display 400 includes a front cover 410, flexible circuits 420 connected with IR LED lights, a fabric wrap 430, and foam 450 to rest against a user's face when the user wears the head-mounted display 400. The head-mounted display 400 further includes a top housing 460 and bottom housing 470 to house an assembly 500, and one or more side mounting brackets 440 (e.g., on left side and right side) coupled between the assembly 500 and the top and bottom housings 460 and 470. The one or more side mounting bracket 440 are further coupled to one or more audio systems 180 in accordance with some embodiments. The fabric wrap 430 is glued to the outer surfaces of the top housing 460 and bottom housing 470 once the top housing 460 and bottom housing 470 have been assembled.

FIGS. 4B-4E are perspective views of the assembly 500 from different angles in accordance with some embodiments. The assembly 500 includes a left lens 510 for a user's left eye and a right lens 515 for the user's right eye. The assembly 500 further includes a left display screen 530 disposed in front of the left lens 510 to provide images to the user's left eye through the left lens 510. Similarly, the assembly 500 includes a right display screen 535 disposed in front of the right lens 515 to provide images to the user's right eye through the right lens 515.

The assembly 500 includes a left eye cup 520 coupled between the left lens 510 and the left display screen 530, and a right eye cup 525 coupled between the right lens 515 and the right display screen 535. The assembly 500 further includes a top bracket 580 and a bottom bracket 570 to mount the assembly 500 to the top housing 460 and the bottom housing 470 as shown in FIG. 4A.

Figure 4F:
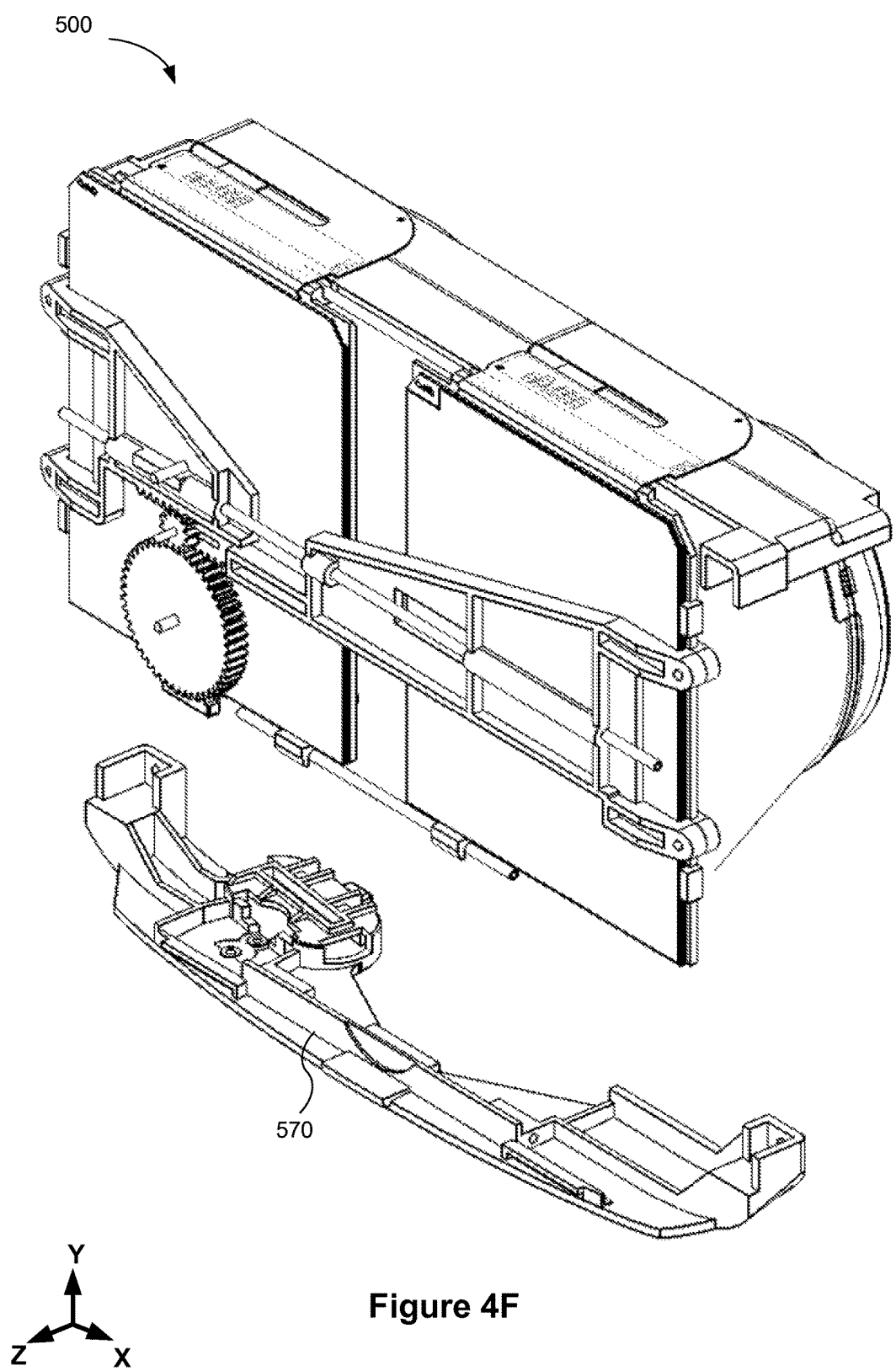

In the assembly 500, the left eye cup 520 and the right eye cup 525 are separate from each other. For example, each eye cup of the left eye cup 520 and the right eye cup 525 is mounted between the top bracket 580 and the bottom bracket 570 respectively. As shown in FIG. 4F, the left eye cup 520 and right eye cup 525 fit in the grooves on the bottom bracket 570. One or more connectors, such as screws, can be used to couple the top bracket 580 and the bottom bracket 570 to the left eye cup 520 and the left display screen 530, and the right eye cup 525 and the right display screen 535. The assembly 500 further includes a left flexible circuit 590 and a right flexible circuit 595 to electrically connect to the left display screen 530 and the right display screen 535.

In some embodiments, a lateral distance between the left eye cup 520 and the right eye cup 525, and a lateral distance between the left display screen 530 and the right display screen 535 are adjustable using any suitable mechanisms, such as a gear train. A corresponding interpupillary distance is thus adjustable.

For example, as shown in FIGS. 4B-4E, the assembly 500 includes a position adjustment mechanism 518 coupled to the left display screen 530, the left eye cup 520, the right display screen 535, and the right eye cup 525. The position adjustment mechanism 518 includes one or more racks coupled with one or more gears. A linear motion of a sliding button 512 can be transferred to linear motions of mounting members coupled to the display screens and the eye cups via a gear train. The sliding button 512 can be slid to adjust a lateral distance between the left display screen 530 and the right display screen 520, and a lateral distance between the left eye cup 520 and the right eye cup 525.

Various embodiments of the position adjustment mechanism 518 are described in U.S. Patent Application No. 62/175,919, filed on Jun. 15, 2015, the disclosure of which is incorporated herein by reference in its entirety.

Figure 5A:
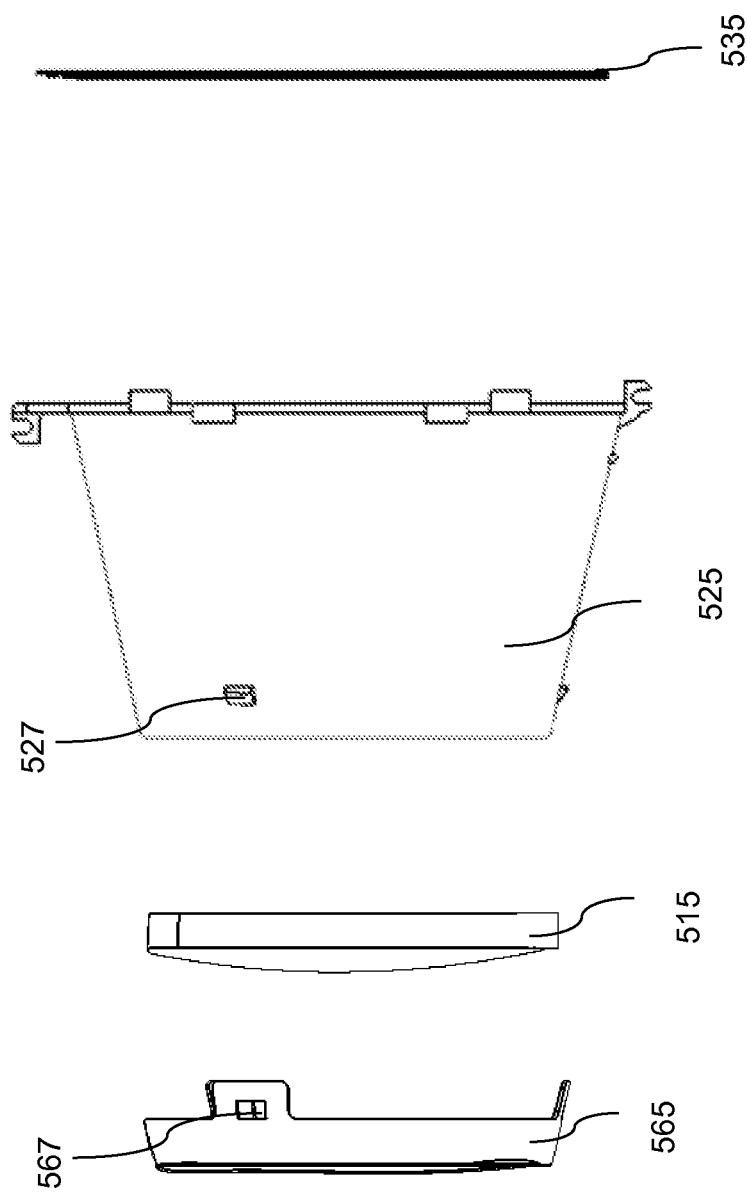
FIGS. 5A-5C are exploded views illustrating components of a head-mounted display in accordance with some embodiments.
Figure 5B:
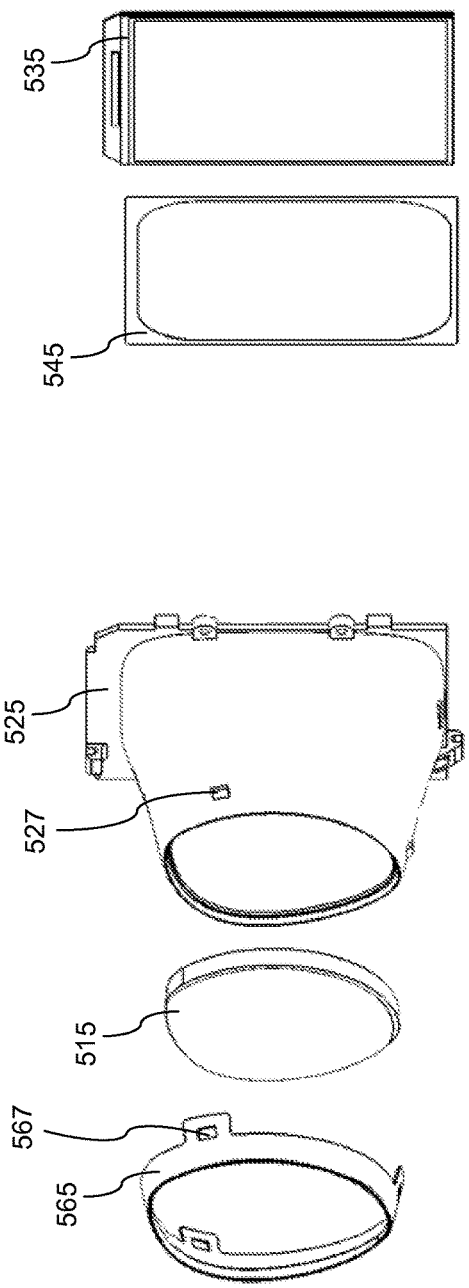
Figure 5C:
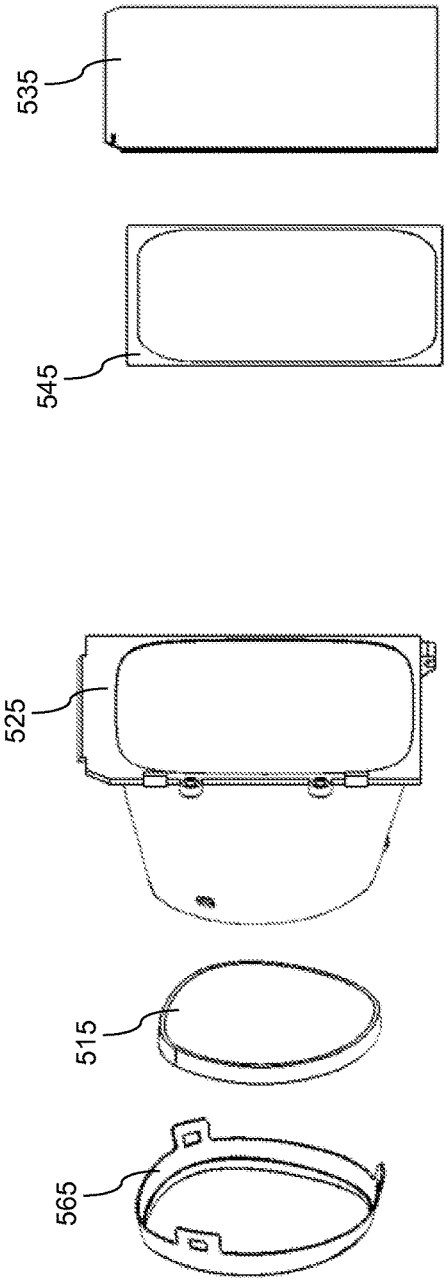

FIGS. 5A-5C are exploded views illustrating components of the assembly 500 for the head-mounted display 400 in accordance with some embodiments. While some example features are illustrated in FIGS. 5A-5C to show the components of the assembly 500 for one eye (e.g., the right eye) of a user, as shown in FIGS. 4B-4F, the components of the assembly 500 for the other eye (e.g., the left eye) may substantially mirror (e.g., to within manufacturing tolerances) the structures illustrated in FIGS. 5A-5C. The components for the other eye have not been illustrated for the sake of brevity and so as not to obscure pertinent aspects of the example embodiments disclosed herein.

As illustrated in FIGS. 5A-5C, for a user's right eye, the assembly 500 includes a right eye cup 525 and a right lens 515 coupled to one end of the right eye cup 525. In some embodiments, the right lens 515 is glued to the right eye cup 525. In some embodiments, a right mounting ring 565 is used to mount an internal fabric (not shown) for the head-mounted display. The internal fabric is glued to the right mounting ring 565, which is snapped onto the right eye cup 525. For example, as shown in FIGS. 5A-5B, the right mounting ring 565 includes apertures 567 to couple to protrusions 527 on the right eye cup 525. Alternatively, the right mounting ring 565 mounts the right lens 515 to the right eye cup 525 (e.g., using apertures 567 and protrusions 527, or using glue). Similarly referring to FIG. 4D, the assembly 500 includes a left eye cup 520, a left lens 510, and a left mounting ring 560 configured in a similar manner as the right eye cup 525, right lens 515, and right mounting ring 565.

The assembly 500 further includes a right display screen 535 disposed in front of the right lens 515 to provide images to the user's right eye through the right lens 515. Similarly referring to FIGS. 4B-4C, the assembly 500 includes a left display screen 530 disposed in front of the left lens 510 to provide images to the user's left eye through the left lens 510. In some embodiments, a lateral distance between the left display screen 530 and the right display screen 535 is adjustable using the position adjustment mechanism 518.

As shown in FIGS. 5B-5C, the assembly 500 further includes a right frame 545 situated between the right eye cup 525 and the right display screen 535. A left frame (not shown) is also situated between the left eye cup 520 and the left display screen 530.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A head-mounted display system, comprising:
a left lens for a user's left eye;
a left display screen coupled to the left lens to provide images to the user's left eye through the left lens;
a right lens for the user's right eye;
a right display screen coupled to the right lens to provide images to the user's right eye through the right lens;
a left eye cup coupled between the left lens and the left display screen;
a right eye cup coupled between the right lens and the right display screen;
a left mounting ring coupled to the left eye cup; and
a right mounting ring coupled to the right eye cup,
wherein the left and right eye cups comprise protrusions, and the left and right mounting rings have apertures to clip to the protrusions,
wherein the protrusions of each of the left and right eye cups include a plurality of protruding tabs, and the apertures of each of the left and right mounting rings include a plurality of openings each configured to independently couple to a respective one of the plurality of protruding tabs.

2. The head-mounted display system of claim 1, wherein a lateral distance between the left display screen and right display screen is adjustable.

3. The head-mounted display system of claim 1, wherein the left eye cup and right eye cup are formed in a single continuous piece.

4. The head-mounted display system of claim 3, further comprising:
an opaque housing; and
a bracket to connect the left eye cup, left display screen, right eye cup, and right display screen to an interior surface of the opaque housing.

5. The head-mounted display system of claim 1, further comprising:
a left frame for the left display screen, the left frame being situated between the left eye cup and the left display screen; and
a right frame for the right display screen, the right frame being situated between the right eye cup and the right display screen.

6. The head-mounted display system of claim 5, wherein:
the left eye cup and right eye cup are formed in a single continuous piece; and
the single continuous piece is integrated with a bracket that holds the left frame and the right frame.

7. The head-mounted display system of claim 5, further comprising:
a top housing coupled to top sides of the left and right frames; and
a bottom housing coupled to bottom sides of the left and right frames.

8. The head-mounted display system of claim 7, wherein the left frame and the right frame are separately mounted between the top housing and the bottom housing.

9. The head-mounted display system of claim 7, further comprising first and second side brackets coupled to respective sides of the left and right frames.

10. The head-mounted display system of claim 1, further comprising:
a circuit board situated above the left and right eye cups and comprising driver circuitry for the left and right display screens; and
flexible circuitry electrically coupling the circuit board to the left and right display screens.

11. The head-mounted display system of claim 10, further comprising a top bracket situated above the left and right eye cups, wherein the circuit board is mounted on the top bracket.

12. A head-mounted display system, comprising:
an opaque housing;
a left display screen, mounted within the opaque housing, for a user's left eye;
a right display screen, mounted within the opaque housing, for the user's right eye;
a left lens for the user's left eye;
a left eye cup coupled between the left lens and the left display screen;
a right lens for the user's right eye; and
a right eye cup coupled between the right lens and the right display screen,
wherein the left and right eye cups comprise protrusions, and the left and right mounting rings have apertures to clip to the protrusions,
wherein the protrusions of each of the left and right eye cups include a plurality of protruding tabs, and the apertures of each of the left and right mounting rings include a plurality of openings each configured to independently couple to a respective one of the plurality of protruding tabs.

13. The head-mounted display system of claim 1, wherein:
the left lens is coupled between the left eye cup and the left mounting ring; and
the right lens is coupled between the right eye cup and the right mounting ring.

14. The head-mounted display system of claim 12, wherein:
the left lens is coupled between the left eye cup and the left mounting ring; and the right lens is coupled between the right eye cup and the right mounting ring.

* * * * *